United States Patent
Wu

(10) Patent No.: US 6,168,342 B1
(45) Date of Patent: Jan. 2, 2001

(54) PIVOT JOINT FOR USE IN A COMPUTER

(76) Inventor: Yu-Chih Wu, 13/F-19, No. 12, Alley 103, Lane 111, Yu-Men Rd., Taichung City (TW)

( * ) Notice: Under 35 U.S.C. 154(b), the term of this patent shall be extended for 0 days.

(21) Appl. No.: 09/225,334

(22) Filed: Jan. 5, 1999

(51) Int. Cl.$^7$ .................................................. E05D 11/04
(52) U.S. Cl. ........................ 403/119; 403/150; 403/120; 16/342
(58) Field of Search .................................. 403/119, 120, 403/117, 113, 150, 164; 16/342

(56) References Cited

U.S. PATENT DOCUMENTS 5,008,976 * 4/1991 Busch .................................. 16/342 X
5,486,056 * 1/1996 Thorn ................................ 403/120 X
5,906,010 * 5/1999 Suzuki ............................... 16/342 X

* cited by examiner

Primary Examiner—Lynne H. Browne
Assistant Examiner—John R. Cottingham
(74) Attorney, Agent, or Firm—Rosenberg, Klein & Lee

(57) ABSTRACT

A pivot joint includes two mounting plates respectively fixedly fastened to two parts of an apparatus and coupled together by a rivet for enabling the two mounting plates to be turned relative to each other, an axle sleeve mounted on the rivet between the two mounting plates, a first washer and a second washer respectively mounted on the rivet and attached to one mounting plate at two opposite sides, wherein the axle sleeve has a recessed hole at one end, and the second washer is made of friction rubber, having a first part received in the recessed hole at one end of the axle sleeve, and a second part stopped against one mounting plate at one side.

1 Claim, 3 Drawing Sheets

PIVOT JOINT FOR USE IN A COMPUTER

BACKGROUND OF THE INVENTION

The present invention relates to a pivot joint for use in a computer, and more particularly to such a pivot joint which can be positively positioned at any of a series of angles.

FIGS. 1A and 1B show a prior art pivot joint for use in for example a notebook computer. This structure of pivot joint comprises a first mounting plate 1 fixedly fastened to the mainframe of the notebook, a second mounting plate 2 fixedly fastened to the cover of the notebook, an axle sleeve 5 coupled between the first mounting plate 1 and the second mounting plate 2, two metal washers 4 attached to the first mounting plate 1 at two opposite sides, a rivet 6 mounted in respective holes 7 at the second mounting plate 2, the axle sleeve 5, the metal washers 4 and the first mounting plate 1, and a locating ring 3 fastened to the end of the rivet 6. The plain end of the rivet 6 is hammered down to form a head after installation of the locating ring 3. This structure of pivot joint is still not satisfactory in function because of the following drawbacks. One drawback of this structure of pivot joint is that the metal washers 4 wear gradually with the use of the pivot joint. When the metal washers 4 start to wear, the connection between the first mounting plate 1 and the second mounting plate 2 become unstable. Another drawback of this structure of pivot joint is its complicated structure. Because this structure of pivot joint consists of a number of parts, its manufacturing cost is relatively high. Furthermore, because the metal washers 4 are rigid and not flexible, they do not provide sufficient resisting force to positively support the second mounting plate 2 on the first mounting plate 1 at a particular angle.

SUMMARY OF THE INVENTION

The present invention provides a pivot joint which eliminates the aforesaid drawbacks. According to the present invention, the pivot joint comprises two mounting plates respectively fixedly fastened to two parts of an apparatus and coupled together by a rivet for enabling the two mounting plates to be turned relative to each other, an axle sleeve mounted on the rivet between the two mounting plates, a first washer and a second washer respectively mounted on the rivet and attached to one mounting plate at two opposite sides. The axle sleeve has a recessed hole at one end. The second washer is made of friction rubber, having a first part received in the recessed hole at one end of the axle sleeve, and a second part stopped against one mounting plate at one side. Because the second washer is made of friction rubber, it can be compressed for allowing the two mounting plates to be turned relative to each other. After relative turning of the mounting plates, the second washer immediately returns to its former shape to hold down the mounting plates at the adjusted angular position.

DETAILED DESCRIPTION OF THE PREFERRED EMBODIMENT

Figure 1A:
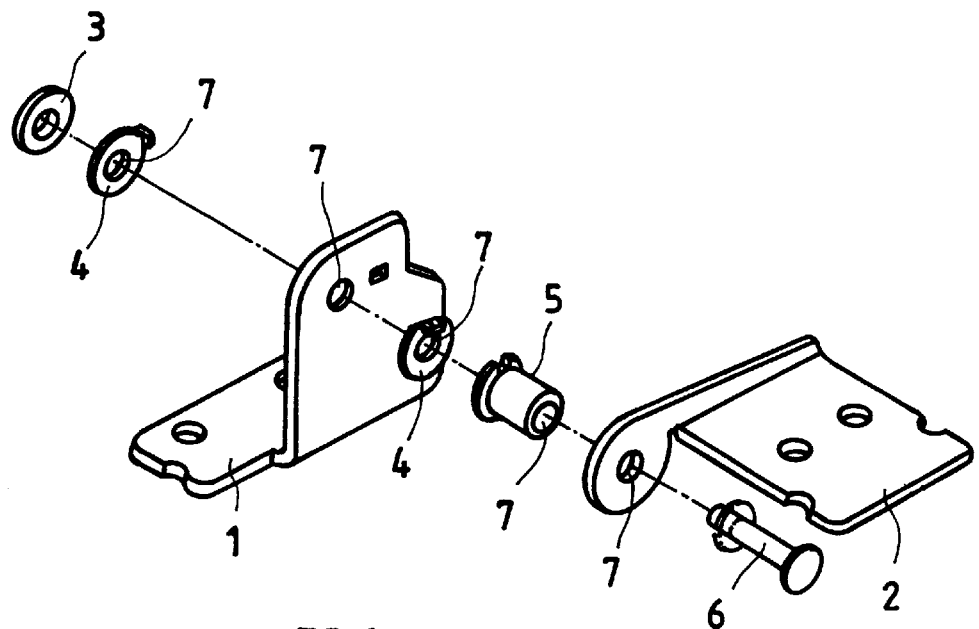
FIG. 1A is an exploded view of a pivot joint according to the prior art.
Figure 1B:
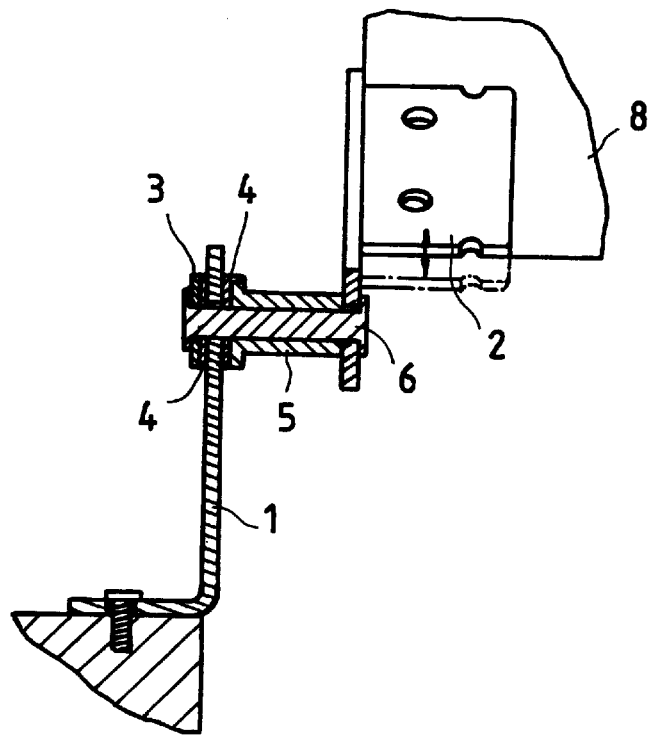
FIG. 1B is a sectional assembly view of the pivot joint shown in FIG. 1A.
Figure 2:
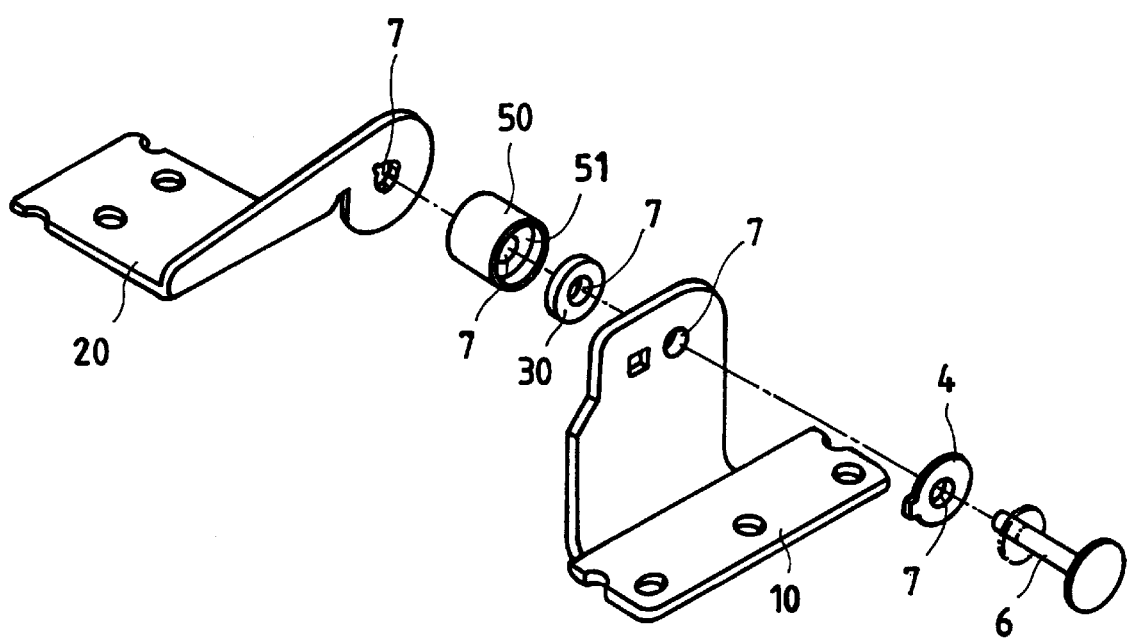
FIG. 2 is an exploded view of a pivot joint according to the present invention.
Figure 3:
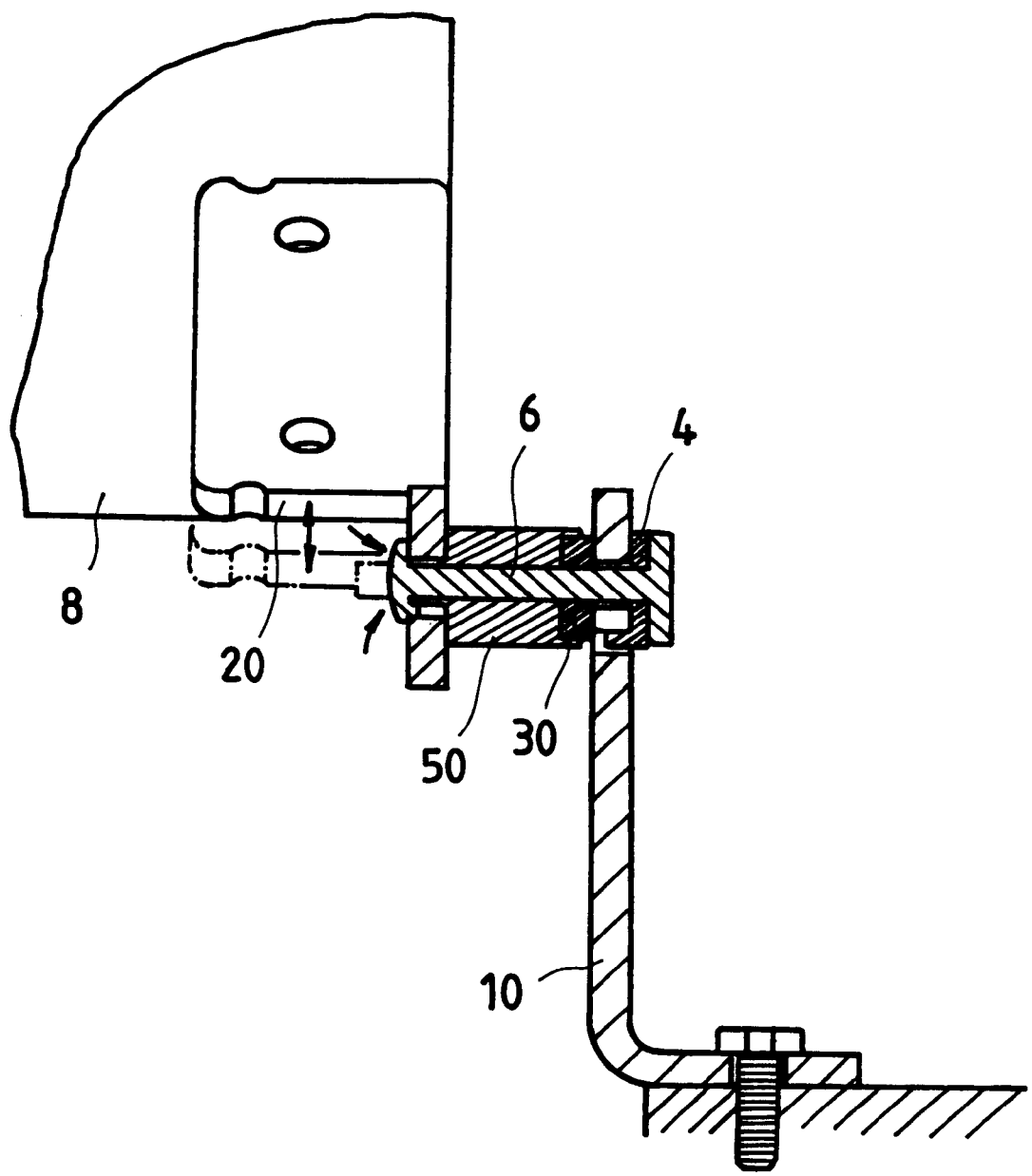
FIG. 3 is a sectional assembly view of the pivot joint shown in FIG. 2.

Referring to FIGS. 2 and 3, a pivot joint in accordance with the present invention is comprised of a first mounting plate 10 fixedly fastened to the mainframe of a notebook computer, a second mounting plate 20 fixedly fastened to the cover 8 of the notebook computer, an axle sleeve 50 coupled between the first mounting plate 10 and the second mounting plate 20, a first washer 4 and a second washer 30 respectively attached to the first mounting plate 10 at two opposite sides, and a rivet 6 mounted in respective holes 7 at the washers 4 and 30, the first mounting plate 10, the axle sleeve 50 and the second mounting plate 20 for enabling the second mounting plate 20 to be turned about the rivet 6 relative to the first mounting plate 20.

The axle sleeve 50 has a recessed bole 51 at one end, which receives the second washer 30 on the inside around the rivet 6, enabling the second washer 30 to be positively stopped against one side of the first mounting plate 20. The second washer 30 is made of friction rubber and partially received in the recessed hole 51 at one end of the axle sleeve 50, having an outer side wall positively stopped against one side of the first mounting plate 20.

When the second mounting plate 20 is turned with the cover of the notebook computer relative to the first mounting plate 10 at the mainframe of the notebook computer, the second washer 30 is compressed, enabling the second mounting plate 20 to be turned with the cover of the notebook computer. When the cover of the notebook computer is released from the hand, the second washer 30 immediately returns to its former shape, imparting a push force to push the axle sleeve 50 away from the first mounting plate 10, enabling the second mounting plate 20 to be firmly retained at the adjusted angle.

What the invention claimed is:

1. A pivot joint comprising a first mounting plate and a second mounting plate respectively fixedly fastened to a first part and a second part of an apparatus, a rivet coupled between said first mounting plate and said second mounting plate for enabling said second mounting plate to be rotated about said rivet relative to said first mounting plate, an axle sleeve having a through bore for mounting on said rivet between said first mounting plate and said second mounting plate, a first washer and a second washer respectively mounted on said rivet and attached to said first mounting plate at two opposite sides, wherein said axle sleeve has an cylindrical recess at one end surrounding said through bore, said second washer being made of friction rubber and having a first end portion thereof received in said cylindrical recess at said one end of said axle sleeve, a second opposing end portion of said second washer being stopped against said first mounting plate.

* * * * *